(12) United States Patent
Yaacob et al.

(10) Patent No.: US 11,212,166 B2
(45) Date of Patent: Dec. 28, 2021

(54) STANDARDIZED REMOTE ACCESS AND SET-UP FOR ELECTRONIC DEVICES

(71) Applicant: Disney Enterprises, Inc., Burbank, CA (US)

(72) Inventors: Yazmaliza Yaacob, Burbank, CA (US); Lee Bombard, Acton, CA (US); Gregory Head, Los Angeles, CA (US); Alexander C. Chen, La Canada-Flintridge, CA (US)

(73) Assignee: Disney Enterprises, Inc., Burbank, CA (US)

( * ) Notice: Subject to any disclaimer, the term of this patent is extended or adjusted under 35 U.S.C. 154(b) by 183 days.

(21) Appl. No.: 15/690,039

(22) Filed: Aug. 29, 2017

(65) Prior Publication Data
US 2019/0068437 A1   Feb. 28, 2019

(51) Int. Cl.
*H04L 12/24*   (2006.01)
*H04L 29/08*   (2006.01)
(Continued)

(52) U.S. Cl.
CPC ...... *H04L 41/0803* (2013.01); *H04L 41/0806* (2013.01); *H04L 67/306* (2013.01)

(58) Field of Classification Search
CPC .............. H04L 41/0803; H04L 67/306; H04N 21/2668; H04N 21/4532; H04N 2005/44569; H04N 21/2187; H04N 21/23109; H04N 21/2393; H04N 21/2541; H04N 21/25808; H04N 21/25883; H04N 21/25891; H04N 21/26283; H04N 21/2665; H04N 21/2743; H04N 21/4126; H04N 21/4223; H04N 21/4627; H04N 21/47; H04N 21/4755; H04N 21/4788;
(Continued)

(56) References Cited

U.S. PATENT DOCUMENTS

5,148,481 A * 9/1992 Abraham .............. G06F 12/121
331/78
7,196,805 B1 * 3/2007 Toebes ................... G06Q 50/10
348/211.1
(Continued)

*Primary Examiner* — David R Lazaro
*Assistant Examiner* — Berhanu Shitayewoldetadik
(74) *Attorney, Agent, or Firm* — Farjami & Farjami LLP (57) ABSTRACT

In one implementation, a system providing remote access set-up for electronic devices includes a mobile device and a profile server communicatively coupled to the mobile device via a network. The profile server includes a hardware processor, and a server memory storing a profile management software code and a profile information associated with a user of the mobile device. The hardware processor executes the profile management software code to receive, via the network, a platform ID of a configurable hardware platform communicatively coupled to the mobile device, and to determine, based on the platform ID, platform assets including a default configuration associated with the configurable hardware platform. The hardware processor further executes the profile management software code to determine, based on the profile information and the default configuration, a user specific configuration for the configurable hardware platform, and to transmit the user specific configuration to configure the configurable hardware platform.

20 Claims, 3 Drawing Sheets

(51) Int. Cl.
*H04B 1/38* (2015.01)
*G06F 15/16* (2006.01)
*H04W 8/20* (2009.01)
*H04N 21/262* (2011.01)
*H04N 5/445* (2011.01)

(58) Field of Classification Search
CPC .......... H04N 21/4826; H04N 21/4882; H04N 21/6112; H04N 21/6118; H04N 21/6125; H04N 21/6131; H04N 21/6582; H04N 21/84; H04N 5/44543
USPC ....................................................... 709/220
See application file for complete search history.

(56) References Cited

U.S. PATENT DOCUMENTS

| | | | | |
|---|---|---|---|---|
| 7,774,811 B2* | 8/2010 | Poslinski | ............... | H04N 21/84 725/45 |
| 8,869,207 B1* | 10/2014 | Earle | ............... | H04N 21/25808 725/48 |
| 9,042,705 B1 | 5/2015 | Klopfenstein | ....... | H04N 21/426 386/248 |
| 9,122,501 B1* | 9/2015 | Hsu | ..................... | G06F 9/44505 |
| 9,491,049 B2* | 11/2016 | Taylor | ................... | G06F 9/4411 |
| 9,846,575 B1* | 12/2017 | Zander | ................... | G06F 9/445 |
| 10,080,061 B1* | 9/2018 | Kirley | ............... | H04N 21/4302 |
| 2002/0004855 A1* | 1/2002 | Cox | ....................... | H04L 29/06 719/328 |
| 2002/0049818 A1* | 4/2002 | Gilhuly | ................ | H04W 12/04 709/206 |
| 2002/0085579 A1* | 7/2002 | Sullivan | ............. | H04L 67/2842 370/428 |
| 2002/0116336 A1* | 8/2002 | Diacakis | ................ | H04L 67/24 705/51 |
| 2003/0103088 A1* | 6/2003 | Dresti | .................... | G08C 17/02 715/835 |
| 2004/0117845 A1* | 6/2004 | Karaoguz | ......... | H04N 21/2541 725/134 |
| 2004/0203694 A1* | 10/2004 | Wong | .................... | H04W 88/06 455/419 |
| 2005/0132005 A1* | 6/2005 | Horvitz | ............... | G06Q 10/109 709/204 |
| 2005/0160468 A1* | 7/2005 | Rodriguez | ......... | H04N 21/4758 725/109 |
| 2006/0048184 A1* | 3/2006 | Poslinski | ............... | H04N 7/163 725/45 |
| 2006/0080415 A1* | 4/2006 | Tu | ....................... | H04L 67/1095 709/220 |
| 2006/0161865 A1* | 7/2006 | Scott | ...................... | G08C 17/00 715/810 |
| 2006/0217111 A1* | 9/2006 | Marolia | .................. | G06Q 30/06 455/418 |
| 2007/0027972 A1* | 2/2007 | Agrawal | ............... | H04L 67/34 709/223 |
| 2007/0150559 A1* | 6/2007 | Smith | ..................... | G06F 21/85 709/220 |
| 2007/0240232 A1* | 10/2007 | Pino | .................. | H04N 21/2221 726/28 |
| 2008/0070495 A1* | 3/2008 | Stricklen | ............... | H04L 67/125 455/3.01 |
| 2008/0155613 A1* | 6/2008 | Benya | ............. | H04N 21/47202 725/89 |
| 2008/0177994 A1* | 7/2008 | Mayer | ............. | G06F 9/4418 713/2 |
| 2008/0195664 A1* | 8/2008 | Maharajh | ............ | H04L 67/306 |
| 2008/0229352 A1* | 9/2008 | Pino | ........................ | H04L 67/22 725/22 |
| 2009/0119714 A1* | 5/2009 | Schlarb | ............... | H04N 21/4312 725/56 |
| 2010/0091762 A1* | 4/2010 | Roberts | ................... | H04L 12/66 370/352 |
| 2010/0169635 A1* | 7/2010 | Chinnaswamy | ........ | G06F 21/57 713/2 |
| 2010/0199299 A1* | 8/2010 | Chang | ................ | H04N 21/4821 725/32 |
| 2010/0199312 A1* | 8/2010 | Chang | ................ | H04N 21/4622 725/46 |
| 2010/0202441 A1* | 8/2010 | Haag | .................... | H04L 41/0803 370/352 |
| 2010/0241836 A1* | 9/2010 | Proudler | ............. | H04L 63/0876 713/1 |
| 2010/0287589 A1* | 11/2010 | Stiers | ................. | H04N 21/4667 725/46 |
| 2010/0318686 A1* | 12/2010 | Ver Steeg | ............. | H04L 67/303 710/8 |
| 2011/0069940 A1* | 3/2011 | Shimy | ................. | H04N 5/44543 386/296 |
| 2012/0011551 A1* | 1/2012 | Levy | .................... | H04N 21/472 725/82 |
| 2012/0036552 A1* | 2/2012 | Dare | .................... | H04L 41/0803 726/1 |
| 2012/0079368 A1* | 3/2012 | Abdelaziz | ............... | H04L 67/18 715/234 |
| 2012/0090007 A1* | 4/2012 | Xiao | ............... | H04N 21/26283 725/46 |
| 2012/0117588 A1* | 5/2012 | McCoy | ............. | H04N 21/4122 725/28 |
| 2012/0123898 A1* | 5/2012 | Kirkeby | ............... | G06Q 30/0631 705/26.7 |
| 2012/0166642 A1* | 6/2012 | Saint Clair | ......... | H04L 12/2818 709/225 |
| 2012/0303768 A1* | 11/2012 | Fiennes | ................. | H04L 12/282 709/220 |
| 2012/0310727 A1* | 12/2012 | Bradley | ................. | G06Q 30/02 705/14.41 |
| 2013/0088650 A1* | 4/2013 | Rouady | ................ | H04N 21/475 348/734 |
| 2013/0262912 A1* | 10/2013 | Dasari | ..................... | G06F 1/266 714/3 |
| 2013/0287212 A1* | 10/2013 | Marko | ................... | H04H 20/74 381/2 |
| 2014/0011492 A1* | 1/2014 | Bharadwaj | ......... | H04L 65/1016 455/422.1 |
| 2014/0248864 A1* | 9/2014 | Rangarajan | ............. | H04W 4/50 455/418 |
| 2014/0269482 A1* | 9/2014 | Pandey | ................... | G08B 25/08 370/312 |
| 2014/0279546 A1* | 9/2014 | Poole | ................. | G06Q 20/3224 705/44 |
| 2014/0344861 A1* | 11/2014 | Berner | ............... | H04N 21/4826 725/46 |
| 2015/0113098 A1* | 4/2015 | VanBuskirk | ........... | G06Q 30/00 709/217 |
| 2015/0308257 A1* | 10/2015 | McCoy | ............... | E21B 47/009 340/853.2 |
| 2015/0365787 A1* | 12/2015 | Farrell | .................. | H04W 4/029 455/456.1 |
| 2016/0037187 A1* | 2/2016 | Das | ..................... | H04N 21/4126 725/62 |
| 2016/0080815 A1* | 3/2016 | Ruffini | ................. | H04N 21/4622 725/46 |
| 2016/0234790 A1* | 8/2016 | D'Angelo | ............... | H04L 43/16 |
| 2016/0269236 A1* | 9/2016 | Chan | ............... | H04L 67/34 |
| 2017/0048170 A1* | 2/2017 | Smullen | ............... | H04L 67/306 |
| 2017/0085941 A1* | 3/2017 | Gupta | ............... | H04N 21/4316 |
| 2017/0118333 A1* | 4/2017 | Faltyn | ............... | H04M 3/42323 |
| 2017/0193443 A1* | 7/2017 | Barcala | ............... | H04W 4/029 |
| 2017/0279677 A1* | 9/2017 | Burke | ..................... | H04L 43/50 |
| 2018/0091573 A1* | 3/2018 | Grosse | ................. | H04N 21/251 |
| 2018/0261079 A1* | 9/2018 | Huang | ................. | G08C 23/04 |
| 2019/0020921 A1* | 1/2019 | Sengupta | ........... | H04N 21/4524 |
| 2019/0090028 A1* | 3/2019 | Kirley | ................. | H04N 21/4302 |
| 2019/0238539 A1* | 8/2019 | Arora | ................. | H04L 63/104 |

* cited by examiner

STANDARDIZED REMOTE ACCESS AND SET-UP FOR ELECTRONIC DEVICES

BACKGROUND

In an increasingly globalized economy, improvements in device compatibility and user accessibility across hardware platforms have become significant priorities in electronic design. Nevertheless, at present, most consumer electronic devices require that a user be in close physical proximity to a device in order to access the individual device configuration set-up options. Moreover, in some instances, users may be unfamiliar with a particular electronic device and may encounter difficulty in accessing its configuration options. Further adding to the burdens and inconvenience associated with electronic device configuration is that a user preferred configuration set-up applied to one device is typically not transferable to other devices.

SUMMARY

There are provided systems and methods for standardized remote access set-up for electronic devices, substantially as shown in and/or described in connection with at least one of the figures, and as set forth more completely in the claims.

DETAILED DESCRIPTION

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

Figure 1:
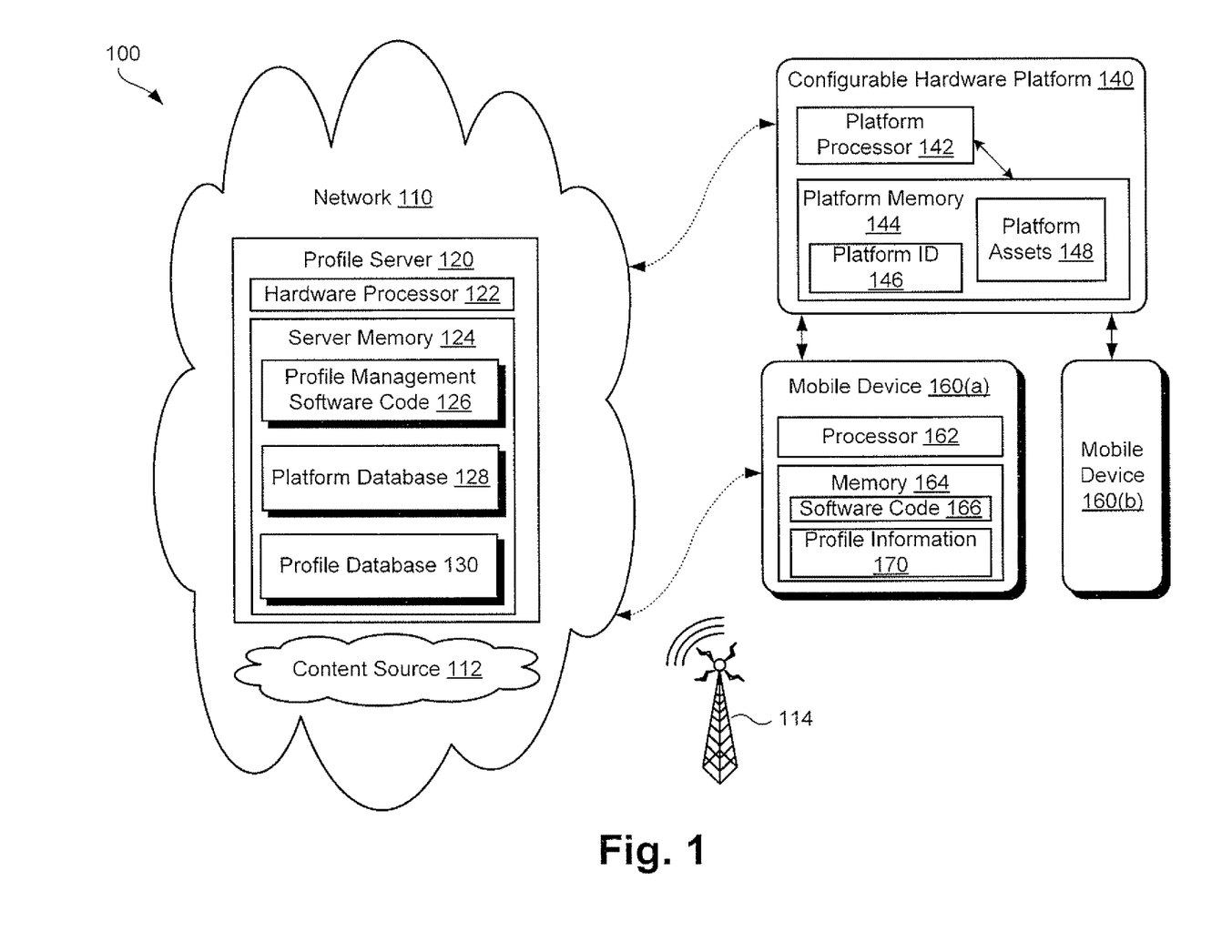
FIG. 1 shows a diagram of a system for standardized remote access set-up for electronic devices, according to one implementation.

FIG. 1 depicts an exemplary implementation for performing standardized remote access set-up for electronic devices, including universal configuration set-up system 100 having profile server 120, mobile device 160a, and mobile device 160b. As shown in FIG. 1, mobile device 160a and mobile device 160b are communicatively coupled to profile server 120 via network 110, which may be a packet-switched network, such as the Internet, for example. Also shown in FIG. 1 is configurable hardware platform 140 communicatively coupled to profile server 120 via network 110, and further communicatively coupled to mobile device 160a and 160b.

Network 110 may also include content source 112, which may be a third party content provider, such as NETFLIX® or AMAZON®, for example. As shown in FIG. 1, mobile device 160a and mobile device 160b may be configured to communicate with profile server 120 via other networks 114, in addition to, or as an alternative to, network 110. Other networks 114 may take the form of modems, modem universal serial bus (USB), wireless local area network (WLAN), radio transceivers utilizing code division multiple access (CDMA), global system for mobile communications (GSM), long-term evolution (LTE), worldwide interoperability for microwave access (WiMAX), and/or other wireless radio transceivers, and/or other well-known network devices.

As shown in FIG. 1, profile server 120 includes hardware processor 122, server memory 124 storing profile management software code 126, platform database 128, and profile database 130. Profile server 120 may include one or more distributed networked computers, which may comprise a plurality of blade servers housed in multiple server racks of an information handling system. In one exemplary implementation, profile server 120 may be implemented in a cloud based processing environment including virtual machines in a virtual environment.

As further shown in FIG. 1, configurable hardware platform 140 includes platform processor 142, platform memory 144 storing platform identification (ID) 146 and platform assets 148. Platform assets 148 may include configuration metadata for a variety of configurable features of configurable hardware platform 140. Examples of platform assets 148 include picture mode settings such as brightness, contrast, sharpness, color, aspect ratio, 3D settings, energy saving preferences, color temperature, sound mode settings, sound out to external speakers, auto volume select, channel line-up, add or remove channel, rename channels, network set-up options, add/remove apps, language features, location, set date/time, parental controls, channel lock-out, accessibility, menu transparency, and closed caption, to name a few. However, it is noted that platform assets 148 may include configuration metadata for other configurable features.

Platform processor 142 can access platform assets 148 and can execute firmware (not shown) stored in platform memory 144 in order to configure configurable hardware platform 140 using platform assets 148. Platform ID 146 may provide a unique identification qualifier such that platform specific assets, i.e. platform assets 148, may be discoverable by profile management software code 126.

In one exemplary implementation, configurable hardware platform 140 may include a television, such as a smart television, an entertainment system having multiple configurable audio/video/lighting components, or other electronic devices having configurable settings. As an example, in one implementation, configurable hardware platform 140 may be a television (hereinafter also "TV 140"), content source 112 may be a source of television programming for TV 140, and platform assets 148 may comprise configuration metadata for TV 140 and may include a default configuration for TV 140.

It is noted, however, that in other exemplary implementations, configurable hardware platform 140 may take other forms. For example, in another exemplary implementation, configurable hardware platform 140 may include electronic devices in various venues, such as a hospital care suite, hotel room, or a sound studio, for example, and platform assets 148 may include configuration metadata for those electronic devices.

As shown in FIG. 1, universal configuration set-up system 100 includes mobile device 160a having processor 162, and memory 164 storing software code 166 and profile information 170. Universal configuration set-up system 100 can also include mobile device 160*b*, which may have a similar structure and function as mobile device 160*a*, the features of which have been omitted herein for simplicity. It is noted that, hereinafter, mobile device 160*a* and mobile device 160*b* will be referred to as mobile device 160, and thus may correspond to one or more mobile devices, each utilized by a respective user (users not shown in FIG. 1). Mobile device 160 may include a smartphone, personal digital assistant, portable media player, tablet computer, laptop, or any other mobile computing device capable of establishing a wireless connection to network 110.

As shown in FIG. 1, mobile device 160 may be configured for storing profile information 170 on memory 164. Profile information 170 may include attributes related to a user of mobile device 160, which, for example, may include but is not limited to, the age, gender, marital status, health restrictions, previous purchases, favorite media content, preferred media genre, and/or hardware platform preferences of the user, such as contrast, brightness, loudness, and other operating preferences for configurable hardware platform 140. Profile information 170 may correspond to a variety of general and specific user preferences. User preferences stored in profile information 170 may be specific for a particular configurable hardware platform 140 or may be generalized preferences, which may or may not be applicable to various configurable features of platform assets 148.

Profile information 170 may include user preferences related to a specific configurable hardware platform 140. For example, in an implementation where configurable hardware platform 140 comprises a particular model of smart television, profile information 170 may include specific settings based on specifications for that particular configurable hardware platform 140. To this extent, profile information 170 corresponding to a specific configurable hardware platform 140 may include platform ID 146.

Profile information 170 may further include general preferences not related to a specific configurable hardware platform 140, however, but rather applicable to many, e.g., a language preference. In an exemplary implementation, profile management software code 126 may be configured to recognize the applicability of general preferences with respect to platform assets 148. For example, in a particular implementation, profile information 170 may include a language preference designation, and platform assets 148 may include configuration metadata for multiple language formats. In this implementation, although profile information 170 may contain a language preference not specifically associated with configurable hardware platform 140, profile management software code 126 may be configured to recognize that the generalized language preference stored in profile information 170 is applicable to a particular platform asset 148. In one particular implementation, profile server 120 collects profile information 170 for storage in profile database 130.

Profile server 120 includes profile database 130. Profile database 130 may be configured to store profile information 170 for all users of mobile device 160. Profile information 170 stored in profile database 130 may be gathered in a variety of manners. In an exemplary implementation, a user of mobile device 160 may directly input profile information 170 via mobile device 160. In one particular implementation, software code 166 may be executed by processor 162 to transmit profile information 170 to profile server 120, via network 110 or other networks 114, in response to receiving profile information 170 input by a user of mobile device 160.

In another implementation, content source 112, for example a third party preferred provider, may provide information corresponding to profile information 170. A third party provider, i.e., content source 112, may have previously retained user information relating to profile information 170. Content source 112, may communicate user preferences provided on the third party website to profile server 120 for storage in profile database 130.

In another exemplary implementation, an administrator of configurable hardware platform 140 may communicate profile information 170 to profile server 120 for storage in profile database 130, via network 110. For example, in a particular implementation, configurable hardware platform 140 may correspond to a hospital care suite, and platform assets 148 may include configuration metadata for various health care related electronic equipment and in-suite entertainment. In this exemplary implementation, the health provider may input health related profile information for managing a patient's recovery process. The health provider may designate specific health-based restrictions and/or preferences for the patient, and may implement health based restrictions using platform assets 148.

For example, in one particular implementation, the health provider may include a hospital and the health provider administrator may include a head nurse. The head nurse may implement a variety of health and wellness conditions using platform assets 148. A patient with hearing disability may have a volume setting for televisions in the facility configured to high using platform assets 148, while a migraine patient with audio/light sensitivity, may implement a low brightness and volume setting audio/video devices using platform assets 148. Other health-based restrictions and preferences have been contemplated herein and may be implemented without diverting from the scope of the present implementation.

In yet another exemplary implementation, third party content source 112 may include the administrator of a hotel wherein the configurable hardware platform 100 includes a multitude of configurable in-room electronic devices. Such in-room electronic devices may include, but are not limited to: TVs, alarm clocks, coffee makers, entertainment centers, speakers, air conditioning, security cameras, and other electronic devices having configurable settings. Platform assets 148 may include configuration metadata for the multitude of configurable in suite electronic devices. Profile information 170 may encompass restricting certain in-room features including entertainment options, configuring language selection, selecting a channel line-up, setting alarm wake up times, loudness, contrast, and a multitude of other preferences related to configurable settings of electronic devices.

In one exemplary implementation, the hotel may be in foreign country having foreign languages. A user may check in the hotel by first communicating with the hotel administrator. Upon entering the hotel room, processor 162 of mobile device 160 may execute software code 166 to relay profile information 170, resulting in the user's preferences being implemented in the hotel room automatically, without further input by the user. In that implementation, user preferences including TV channel line-up, language selection, and room climate are seamlessly implemented without any further action taken by the user.

As a specific example, where configurable hardware platform 140 is TV 140 and content source 112 is a locally accessible source of television programming for TV 140, the television programming content and/or the channel line-up may vary depending on the geographical location of TV 140. That is to say, the default channel line-up and/or content available from content source 112 to TV 140 receiving content in country "A" may differ substantially from the channel line-up and/or content available from content source 112 to TV 140 receiving content in another country "B." Nevertheless, hardware processor 122 of profile server 120 may be configured to execute profile management software code 126 to map the content or programming preferences included in profile information 170 to the TV channel line-up included as part of platform assets 148.

In yet another exemplary implementation, configurable hardware platform 140 may include a sound recording studio wherein various artists and talent correspond to users. Each artist/talent has their own preferences, i.e., profile information 170, corresponding to configuration metadata for lighting, sound engineering, and hardware set-up, i.e., platform assets 148. In other words, platform assets 148 may include configuration metadata for sound recording equipment and studio lighting. A studio administrator may implement the exemplary implementations described herein.

As shown in FIG. 1, profile server 120 may include platform database 128, which may be configured to store information related to configurable hardware platform 140, including platform assets 148. In a particular implementation profile server 120 is configured to gather and store information for various different types of configurable hardware platform 140.

In a particular implementation, profile management software code 126 may be configured to continuously seek technical specifications for all types of audio/video electronic devices that may correlate to a configurable hardware platform 140. In this manner, universal configuration set-up system 100 is designed to learn and expand platform database 128 by maintaining a growing library of compatible configurable hardware platform 140 that may benefit from the implementations described herein. For example, configurable hardware platform 140 may comprise TVs made by a particular manufacturer. Technical specification for all TVs made by the manufacturer may be cataloged and indexed in platform database 128 and correlated with platform IDs 146.

Figure 2:
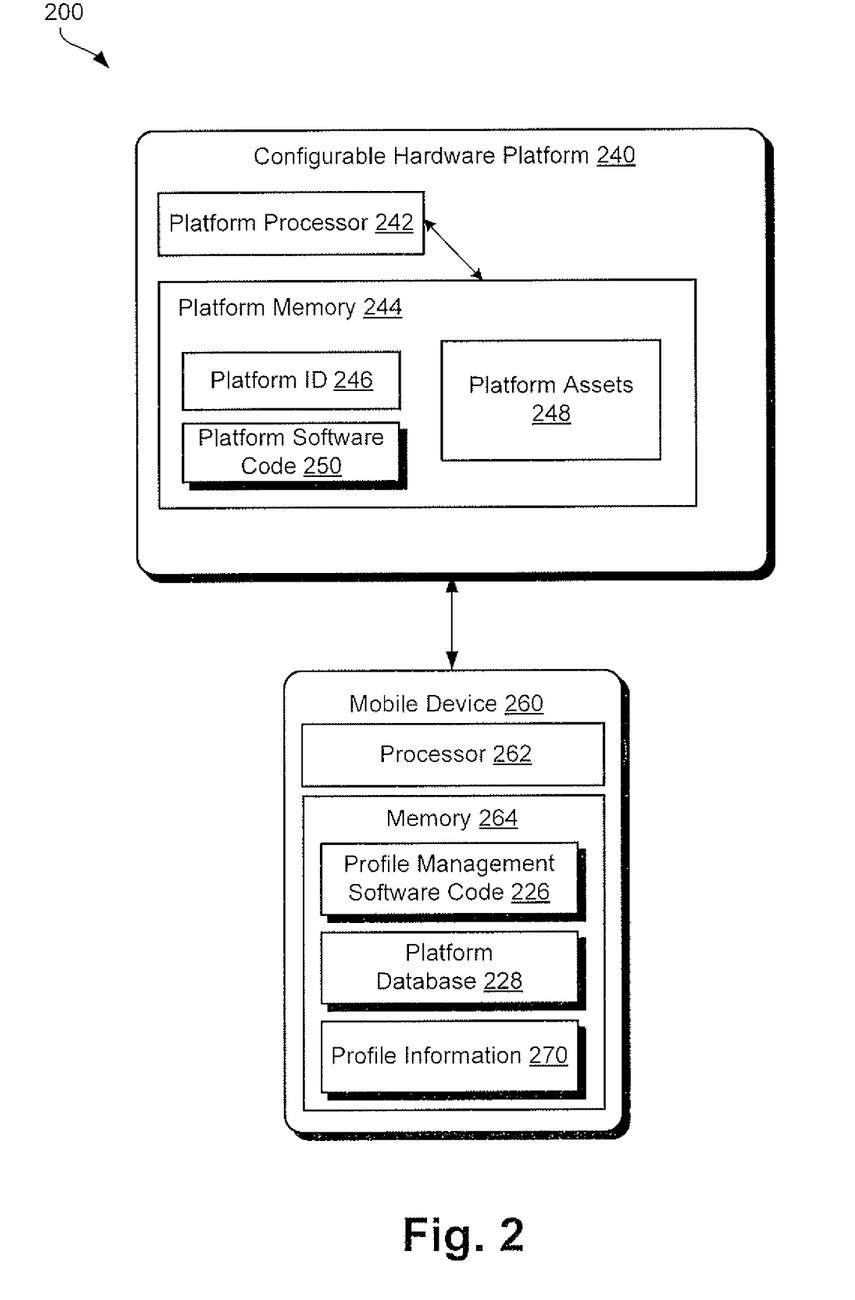
FIG. 2 shows another diagram of a system for standardized remote access set-up for electronic devices, according to another implementation.

Referring now to FIG. 2, FIG. 2 shows universal configuration set-up system 200 for performing standardized remote access set-up for electronic devices, according to another exemplary implementation. As shown in FIG. 2, universal configuration set-up system 200 includes mobile device 260 having processor 262, implemented as a hardware processor, and memory 264 storing profile management software code 226, platform database 228, and profile information 270. Also shown in FIG. 2 is configurable hardware platform 240 having platform processor 242, and platform memory 244 storing platform ID 246, platform software code 250, and platform assets 248.

It is noted that features identified by corresponding reference numbers in FIGS. 1 and 2 correspond respectively in general with one another, and may share any of the characteristics attributed to either corresponding feature by the present disclosure. Thus, mobile device 260 and configurable hardware platform 240 correspond respectively in general to mobile device 160 and configurable hardware platform 140, in FIG. 1.

In contrast to FIG. 1, however, memory 264 of mobile device 260 has profile management software code 226 and platform database 228 stored therein. Profile management software code 226, when executed by processor 262, is capable of performing the actions attributed to profile management software code 126 when executed by hardware processor 122 of profile server 120, in FIG. 1.

Moreover, and in further contrast to FIG. 1, according to the exemplary implementation shown in FIG. 2, mobile device 260 may be configured to communicate directly with configurable hardware platform 240, without the mediation of network, e.g. network 110 or other networks 114. In an exemplary implementation, mobile device 260 and configurable hardware platform 240 are communicatively coupled by low energy radio frequency (RF) transceivers (not shown in FIG. 2), which utilize low energy packet based communication protocol suitable for short range, robust, low cost, and low power wireless communication.

Communication between mobile device 260 and configurable hardware platform 240 may include real-time pairing and response functionality. In an exemplary implementation, BLUETOOTH® protocol may be implemented for providing communication between mobile device 260 and configurable hardware platform 240. However, other methods of low energy wireless communication may be implemented without diverting from the scope of the present application, including but not limited to: ZIGBEE, WIFI, DASH7, INFRARED, Z-WAVE, and 6LoWAPAN. Thus, in one implementation, mobile device 260 may receive platform ID 246 from configurable hardware platform 240 via any of the communication protocols described above.

Figure 3:
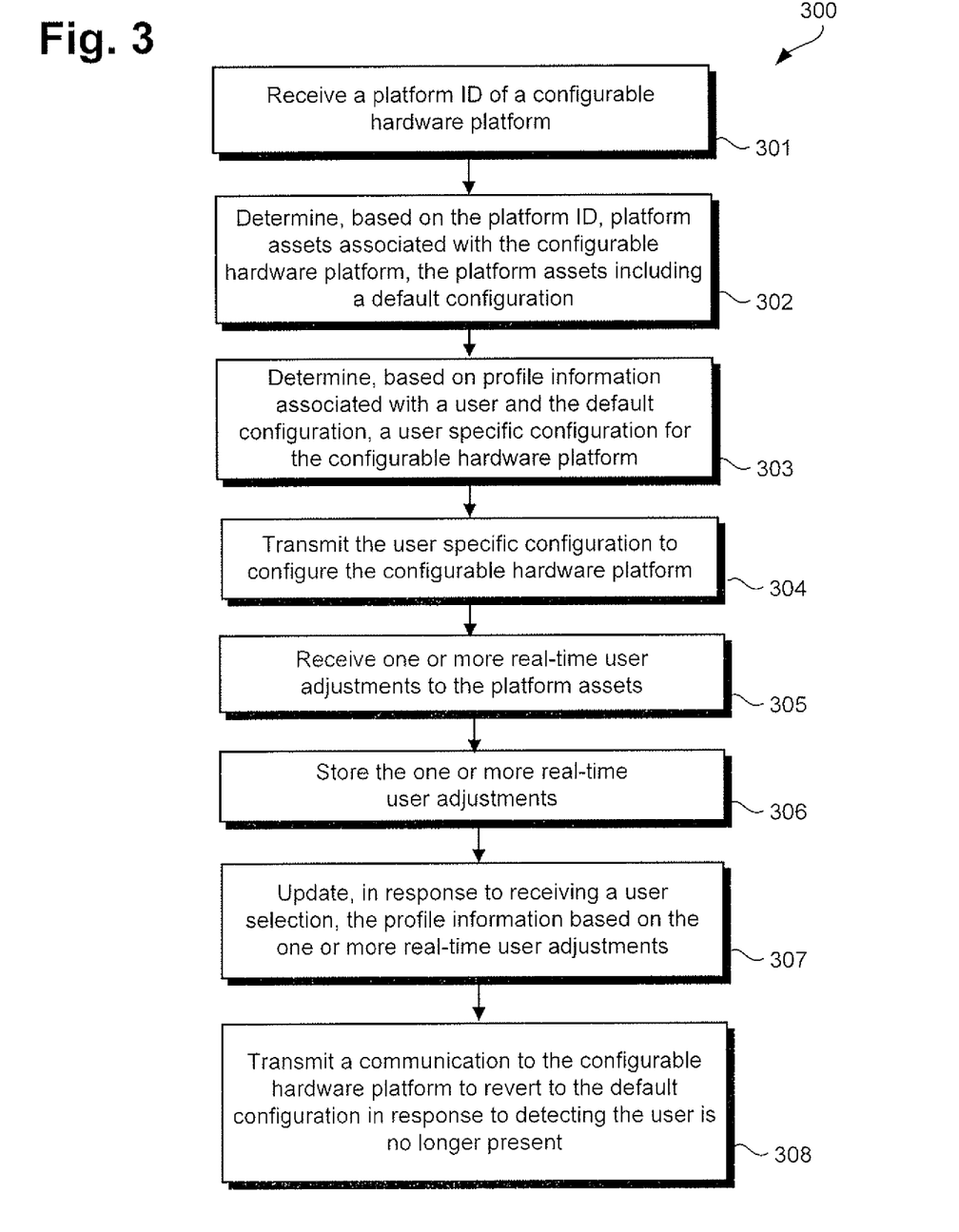
FIG. 3 shows a flowchart presenting an exemplary method for performing standardized remote access set-up for electronic devices.

Referring now to FIG. 3 in conjunction with FIGS. 1 and 2, FIG. 3 shows flowchart 300 depicting an exemplary method for use by universal configuration set-up system 100/200. Flowchart 300 begins with receiving platform ID 146/246 from configurable hardware platform 140/240 communicatively coupled to mobile device 160/260 (action 301). Receiving platform ID 146/246 may take place as part of a log on procedure, for example. In a particular implementation, profile management software code 126/226 may be configured to initiate a log on process when mobile device 160/260 comes within a predetermined physical distance of configurable hardware platform 140/240. Initiating the log on procedure may be facilitated by proximity detection of RF transceivers found in mobile device 160/260 and configurable hardware platform 140/240, e.g., by ascertaining signal strength, for example.

In one exemplary implementation, configurable hardware platform 140240 may not have RF transceivers or other features able to autonomously participate in a log on process. In this implementation, a user of mobile device 160/260 may input platform ID 146/246 to mobile device 160/260 based on a visual inspection of configurable hardware platform 140/240. For example, platform ID 146/246 may be the manufacturer and model of a particular configurable hardware platform 140/240.

In some implementations, as shown by FIG. 1, platform ID 146 may be received by profile management software code 126, executed by hardware processor 122 of profile server 120. In those implementations, platform ID 146 may be received from configurable hardware platform 140 via network 110. However, in other implementations, and as shown by FIG. 2, platform ID 246 may be received by profile management software code 226, executed by processor 262 of mobile device 260.

Flowchart 300 continues with determining, based on platform ID 146/246, platform assets 148/248 associated with configurable hardware platform 140/240, platform assets 148/248 including a default configuration (action 302). In a particular implementation, an administrator sets at least one minimum level and one maximum level of operation for features configured using platform assets 148/248. Setting minimum and maximum levels of operation may include setting timing constraints for features configured using platform assets 148/248 based on the time of day. Other administrator settings may include enabling or disabling particular features controlled using platform assets 148/248 based on a predetermined access level assigned to the user, for example.

In some implementations, determination of platform assets 148 may be performed by profile management software code 126, executed by hardware processor 122 of profile server 120. In other implementations, determination of platform assets 248 may be performed by profile management software code 226, executed by processor 262 of mobile device 260.

Flowchart 300 continues with determining, based on profile information 170/270 and the default configuration included in platform assets 148/248, a user specific configuration for configurable hardware platform 140/240 (action 303). In some implementations, determination of the user specific configuration may be performed by profile management software code 126, executed by hardware processor 122 of profile server 120. In other implementations, determination of the user specific configuration may be performed by profile management software code 226, executed by processor 262 of mobile device 260.

It is noted that, in some implementations, as shown in FIG. 1, universal configuration set-up system 100/200 may include more than one mobile device, i.e., first mobile device 160a utilized by a first user, and second mobile device 160b utilized by a second user. In that implementation, profile management software code 126/226 may be configured to prioritize the first user by implementing a first profile information 170/270 associated with the first user over a second profile information associated with the second user.

Prioritizing the first user may include ignoring the preferences of the second user by not implementing the second profile information when determining the user specific configuration. In another implementation, prioritizing the first profile information over the second profile information may include profile blending.

With respect to profile blending, and referring to FIG. 1, when there are two or more mobile devices 160a and 160b, hardware processor 122 of profile server 120 may be configured to execute profile management software code 126- to, in response to receiving a user selection from the first user, blend first profile information 170 associated with the first user with the second profile information associated with the second user. Blending first profile information 170 with the second profile information may be achieved in a variety of ways.

In a particular implementation, blending profile information includes quantifying user preferences and determining an average or midpoint value. For example, first profile information 170 may include a preferences for speaker volume set at high, while the second profile information may include a preference for speaker volume set at low. Profile management software code 126 may be configured to quantify these preferences and take an average or midpoint of the volume between high and low, for example, mid-level.

In another implementation, profile blending may provide the first user a choice as to which setting for a particular feature is to be implemented. For example, when the first user is logged on and a second subsequently joins, the first user may receive a notification alerting of the presence of the second user. In response to a selection by the first user, profile management software code 170 may be configured to present the first user with a list of potential platform assets 148 that would require adjusting in order to accommodate the second user.

Profile management software code 126 may be configured to further present the first user, via mobile device 160a, a choice to either prioritize first profile information 170 over the second profile information, or otherwise, implement profile blending as described above. If a certain platform asset 148 is not compatible for blending, then either first profile information 170 or the second profile information may be implemented in response to another user selection.

After either prioritizing or blending first profile information 170 and the second profile information, profile management software code 126 may be configured to determine the specific user configuration based on the prioritized or blended first profile information 170 and the second profile information.

In yet another implementation, profile prioritization and blending occurs within the limits of a maximum and minimum operation level implemented by the platform administrator. As noted above, the platform administrator may set one or more maximum levels and one or more minimum levels of operation for features of configurable hardware platform 140 configured using platform assets 148. The one or more maximum and minimum level of operation may be considered when determining the user specific configuration based on first profile information 170 and/or the second profile information, and the default configuration.

In some implementations, Flowchart 300 may conclude with transmitting the user specific configuration to configure configurable hardware platform 140/240 (action 304). In one exemplary implementation, transmitting the user specific configuration comprises identifying a platform compatible format and transmitting the user specific configuration to configure configurable hardware platform 140/240 in the platform compatible format. For example, in an exemplary implementation, a user in Asia may need to access configurable hardware platform 140/240 having a different protocol than analogous platforms used in Europe or the United States. That protocol may be associated with platform ID 146/246, and may be stored in platform database 128/228.

In some implementations, transmitting the user specific configuration to configure configurable hardware platform 140 may be performed by profile management software code 126, executed by hardware processor 122 of profile server 120. In other implementations, transmitting the user specific configuration to configure configurable hardware platform 240 may be performed by profile management software code 226, executed by processor 262 of mobile device 260.

In some implementations, universal configuration set-up system 100/200 may implement adaptive learning and modify profile information 170/270 by learning user changes to platform assets 148/248. By adaptively learning user changes to platform assets 148/248 universal configuration set-up system 100/200 relieves a user of the burden of modifying profile information 170/270 manually before the next use of configurable hardware platform 140/240, thereby increasing user friendliness and functionality.

In order to facilitate adaptive learning, hardware processor 122/262 may be configured to execute respective profile management software code 126/226 to receive one or more real-time user adjustments to platform assets 148/248 (action 305), store the one or more real-time user adjustments (action 306), and update, in response to a second user selection, profile information 170/270 based on the one or more real-time user adjustments (action 307).

In an exemplary implementation, flowchart 300 may also include transmitting a communication to configurable hardware platform 140/240 to revert platform assets 148/248 to the default configuration in response to determining the user is no longer present (action 308). Transmission of the communication to revert platform assets 148/248 to the default configuration may be performed by profile management software code 126/226, executed by respective hardware processor 122/262. Determining the user is no longer present may be implemented in a variety of manners. For example, and referring to FIG. 1, in one implementation, mobile device 160 may transmit data to profile server 120 when mobile device 160 and configurable hardware platform 140 are no longer paired. Unpairing of mobile device 160 and configurable hardware platform 140 may indicate the user is no longer present. In another exemplary implementation, and referring to FIGS. 1 and 2, determining the user is no longer present may occur in response to receiving a user input indicating the user wishes to log off configurable hardware platform 140/240. Reverting platform assets 148/248 to the default configuration may be implemented by configurable hardware platform 140/240 as part of the logging off process.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
    a profile server communicatively coupled to a mobile device via a network, the profile server having a hardware processor and a server memory storing a profile management software code and a user profile information associated with a user of the mobile device;
    wherein the hardware processor is configured to execute the profile management software code to:
        receive, via the network, a platform ID of a configurable hardware platform communicatively coupled to the mobile device, the configurable hardware platform being a television having a television channel line-up set to a first channel line-up, wherein the first channel line-up is a default television programming channel line-up;
        determine, based on the user profile information and the platform ID, a second channel line-up, wherein the second channel line-up is a user specific television programming channel line-up different than the first channel line-up;
        transmit the second channel line-up to the television to change the television channel line-up from the first channel line-up to the second channel line-up; and
        after transmitting the second channel line-up to the television, in response to determining that the mobile device is no longer communicatively coupled to the television, transmit a reversion communication to the television, wherein the reversion communication is configured to change and revert the television channel line-up from the second channel line-up back to the first channel line-up.

2. The system of claim 1, wherein determining the second channel line-up comprises:
    identifying a platform compatible format of the television; and
    transmitting the second channel line-up to configure the television in the platform compatible format.

3. The system of claim 1, wherein the profile server is communicatively coupled to a second mobile device via the network, the second mobile device being associated with a second user having a second user profile information, wherein the hardware processor is further configured to execute the profile management software code to prioritize the user over the second user by implementing the user profile information over the second user profile information of the second user.

4. The system of claim 3, wherein the hardware processor is further configured to execute the profile management software code to:
    in response to receiving a user selection from the user, blend the user profile information and the second user profile information to generate blended profile information; and
    determine the second channel line-up based on the blended profile information.

5. The system of claim 1, wherein the hardware processor is further configured to execute the profile management software code to:
    receive one or more real-time user adjustments;
    store the one or more real-time user adjustments; and
    update, in response to receiving a user selection, the user profile information based on the one or more real-time user adjustments.

6. The system of claim 1, wherein the hardware processor is further configured to execute the profile management software code to transmit a user brightness setting stored in the user profile information to the television to change a default brightness setting of the television.

7. The system of claim 1, wherein the hardware processor is further configured to execute the profile management software code to transmit a user contrast setting stored in the user profile information to the television to change a default contrast setting of the television.

8. The system of claim 1, wherein the hardware processor is further configured to execute the profile management software code to transmit a user volume setting stored in the user profile information to the television to change a default volume setting of the television.

9. The system of claim 1, wherein the hardware processor is further configured to execute the profile management software code to transmit a user language preference stored in the user profile information to the television to change a default language preference of the television.

10. The system of claim 1, wherein the hardware processor is further configured to execute the profile management software code to transmit a user parental control setting stored in the user profile information to the television to change a default parental control setting of the television.

11. A method for use by a system including a profile server communicatively coupled to a mobile device via a network, the profile server having a hardware processor and a server memory storing a profile management software code and a user profile information associated with a user of the mobile device, the method comprising:

receiving, via the network, a platform ID of a configurable hardware platform communicatively coupled to the mobile device, the configurable hardware platform being a television having a television channel line-up set to a first channel line-up, wherein the first channel line-up is a default television programming channel line-up;

determining, based on the user profile information and the platform ID, a second channel line-up, wherein the second channel line-up is a user specific television programming channel line-up different than the first channel line-up;

transmitting the second channel line-up to the television to change the television channel line-up from the first channel line-up to the second channel line-up; and after transmitting the second channel line-up to the television, in response to determining that the mobile device is no longer communicatively coupled to the television, transmitting a reversion communication to the television, wherein the reversion communication is configured to change and revert the television channel line-up from the second channel line-up back to the first channel line-up.

12. The method of claim 11, wherein determining the second channel line-up comprises:

identifying a platform compatible format of the television; and transmitting the second channel line-up to configure the television in the platform compatible format.

13. The method of claim 11, wherein the profile server communicatively is coupled to a second mobile device via the network, the second mobile device being associated with a second user having a second profile information, the method further comprising:

prioritizing the user over the second user by implementing the user profile information over the second user profile information of the second user.

14. The method of claim 13, further comprising:

in response to receiving a user selection from the user, blending the user profile information and the second user profile information to generate blended profile information; and determining the second channel line-up based on the blended profile information.

15. The method of claim 11, further comprising:

receiving one or more real-time user adjustments;

storing the one or more real-time user adjustments; and updating, in response to receiving a user selection, the user profile information based on the one or more real-time user adjustments.

16. The method of claim 11, further comprising:

transmitting a user brightness setting stored in the user profile information to the television to change a default brightness setting of the television.

17. The method of claim 11, further comprising:

transmitting a user contrast setting stored in the user profile information to the television to change a default contrast setting of the television.

18. The method of claim 11, further comprising:

transmitting a user volume setting stored in the user profile information to the television to change a default volume setting of the television.

19. The method of claim 11, further comprising:

transmitting a user language preference stored in the user profile information to the television to change a default language preference of the television.

20. The method of claim 11, further comprising:

transmitting a user parental control setting stored in the user profile information to the television to change a default parental control setting of the television.

* * * * *